United States Patent
Shrader et al.

(10) Patent No.: US 8,441,668 B2
(45) Date of Patent: May 14, 2013

(54) PERMANENCE ESTIMATION AND POLICY ENFORCEMENT FOR TRANSIENT PRINTING

(75) Inventors: Eric J. Shrader, Belmont, CA (US); Victoria Mary Elizabeth Bellotti, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1041 days.

(21) Appl. No.: 12/420,778

(22) Filed: Apr. 8, 2009

(65) Prior Publication Data
US 2010/0259780 A1 Oct. 14, 2010

(51) Int. Cl.
*G06F 3/12* (2006.01)

(52) U.S. Cl.
USPC ........... 358/1.15; 358/1.6; 358/1.9; 358/1.13; 358/1.16; 358/1.18; 358/3.28; 347/101; 399/45; 430/19

(58) Field of Classification Search ................. None
See application file for complete search history.

(56) References Cited

U.S. PATENT DOCUMENTS

| | | | |
|---|---|---|---|
| 6,731,393 B1 * | 5/2004 | Currans et al. | 358/1.12 |
| 7,166,420 B2 | 1/2007 | Chopra et al. | |
| 7,202,006 B2 | 4/2007 | Chopra et al. | |
| 7,205,088 B2 | 4/2007 | Iftime et al. | |
| 7,214,456 B2 | 5/2007 | Iftime et al. | |
| 7,229,740 B2 | 6/2007 | Iftime et al. | |
| 7,300,727 B2 | 11/2007 | Kazmaier et al. | |
| 7,316,875 B2 | 1/2008 | Iftime et al. | |
| 7,381,506 B2 | 6/2008 | Iftime et al. | |
| 7,432,027 B2 | 10/2008 | Chopra et al. | |
| 2004/0136033 A1 * | 7/2004 | Glaspy et al. | 358/1.18 |
| 2004/0216048 A1 * | 10/2004 | Brown et al. | 715/530 |
| 2005/0024346 A1 * | 2/2005 | Dupraz et al. | 345/179 |
| 2005/0141906 A1 * | 6/2005 | Murakami | 399/45 |
| 2008/0137132 A1 * | 6/2008 | Perronnin | 358/1.15 |
| 2008/0191136 A1 | 8/2008 | Shrader et al. | |

* cited by examiner

*Primary Examiner* — Miya J Cato
(74) *Attorney, Agent, or Firm* — Marger Johnson & McCollom, P.C.

(57) ABSTRACT

A computer-implemented method can include receiving a transient printing policy and enforcing the transient printing policy. Enforcement of the transient printing policy can include receiving a request to print a document and, based on the transient printing policy, providing a printing recommendation for the document.

16 Claims, 4 Drawing Sheets

PERMANENCE ESTIMATION AND POLICY ENFORCEMENT FOR TRANSIENT PRINTING

TECHNICAL FIELD

The disclosed technology relates to the field of transient documents and, more particularly, to various techniques pertaining to permanence estimation and policy enforcement for transient document based systems.

BACKGROUND

As used herein, transient document media is media that is suitable for use with transient printing technology, such as reusable paper. Thus, a printed transient document is a document that consists of transient document media. One type of printed transient document is a special type of reusable paper that is treated with a chemical capable of changing color when exposed to a light source or to a heat source. Such exposure of the transient ink to the source results in the creation of an image (e.g., text and/or graphics) that can last for a certain period of time (e.g., one or two days) before fading away and ultimately disappearing. Alternatively, a user can proactively erase at least a portion of the image on the printed transient document by exposing the printed transient document to a particular source such as a light source or a heat source.

With the emergence of printed transient documents, the same physical document can be used repeatedly over the course of multiple cycles of user interaction. By allowing a user to use the same physical document over and over again, a transient document based system enables the user to effectively reduce the amount of paper that would otherwise be used to print multiple copies of a document such as successive revisions thereof.

The use of transient documents is particularly effective for documents that need only be available for a limited time. For example, a user can print a non-final draft of a legal brief using transient document media. The user can subsequently print each successive revision of the draft on the same media before achieving the final draft. Once the final draft is completed, the user can print a copy of the final draft in a more permanent manner using regular ink on traditional paper, for example.

The use of transient document media for printing legal documents can provide an additional benefit in that such use prevents virtually any revision of each legal document printed using transient document media from being discoverable. This is because the text of each version of the document that is printed on the transient document media would disappear at a certain point, such as after a certain amount of time has passed or after the transient ink has been proactively erased by exposure to a light source or to a heat source, for example. The real estate and mortgage industries are other industries that can greatly benefit from the use of transient documents, as those particular industries often use a large amount of paper for multiple revisions of various types of documents.

However, there remains a need for effective permanence estimation and policy enforcement for transient document based systems. For example, while the use of transient document media can save paper and money, such use typically requires that users determine which documents should be printed using transient document media and which documents should be printed using traditional, permanent document media. These determinations can easily take up a user's time and disrupt the user's thought process, thereby resulting in a cost to his or her employer that is significantly less than optimal.

DETAILED DESCRIPTION

Figure 1:
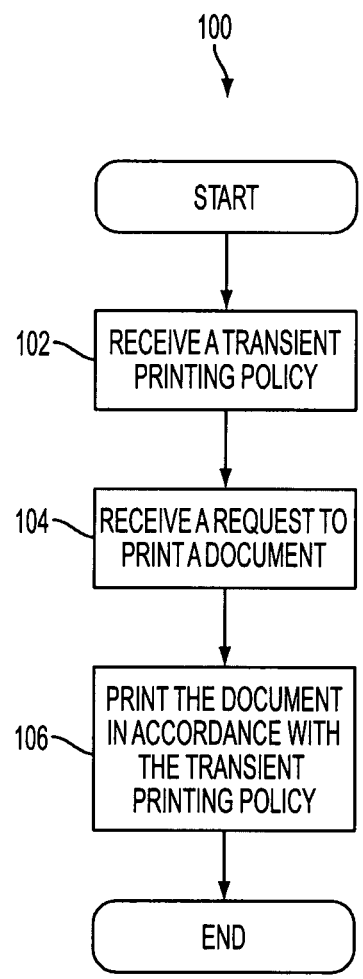
FIG. 1 illustrates a first example of a method pertaining to policy enforcement in accordance with embodiments of the disclosed technology.

Embodiments of the disclosed technology can include estimating and enforcing a required or allowed permanency for a particular document, user, or group of users, where a group may be defined, for example, as those within a certain job role or within a department in an organization. For example, certain embodiments can involve a combination of policy enforcement with user behavior monitoring in order to determine and provide a user with recommendations pertaining to whether a particular document should be printed on traditional or permanent paper or whether the document should be printed on transient document media such as reusable paper. The recommendations can include mere suggestions or strict requirements.

As used herein, a transient printing policy is a collection of rules that describe how transient printing resources can be used and also describe how the printing of transient documents will be managed. Embodiments of the disclosed technology can include receiving a transient printing policy and enforcing the transient printing policy each time the system receives a print request.

In certain embodiments, the system can monitor the printing behavior of a particular user or group of users. Based on the monitored behavior, the system can generate a new transient printing profile or update an existing transient printing profile for each user or group. The system can further use the generated or updated transient printing profile to create a new transient printing policy or modify an exiting transient printing policy.

Removing the process of requiring a user to manually decide between the use of printed transient documents and permanent documents (e.g., based on the user's own previous per-document activities) is an important step toward the integration of transient documents into business workflow. Such integration enables a transient document based system to employ transient document media such as reusable paper when appropriate, without troubling the user with any unnecessary decisions.

Corporations are generally interested in adopting the use of transient document media such as reusable paper for a variety of reasons. For example, they are often interested in the monetary savings associated with printing documents that have short lifetimes using reusable media, in addition to the positive environmental impact resulting from the corresponding reduction in paper waste. Corporations also tend to be interested in the security aspect of the disappearance of temporary drafts of documents. For example, early revisions of legal documents such as legal briefs that were printed on transient documents may become undiscoverable by virtue of the printed text naturally fading away.

Companies are generally interested in systems that make the incorporation of reusable paper into their workflows as seamless as possible. For example, managers typically do not want their workers spending time thinking about how to print a document, such as trying to determine whether to created a printed transient document or a printed permanent document. The various embodiments described herein can provide this seamless integration.

Transient Printing Policies and Transient Printing Policy Enforcement

Corporations and corporate information technology (IT) departments often have printing policies and rules in place that can be used to limit printing costs. For example, companies may have printing policies that limit printing to a color printer to a particular grade level of employee. Such policies may also mandate certain departmental charge-back for printing to specific printers, as well as enforced watermarking for draft modes.

In certain embodiments, a policy enforcement module can be incorporated into a print driver to enforce the printing of documents on reusable paper if they are from certain designated applications, such as email, or if they are from specific applications unless authorized by a digital sign-off, such as legal drafts. Employee role, employee grade, and other factors can also be taken into account when determining a particular policy and corresponding printing rules.

Enforcement of a transient printing policy can prevent situations in which an employee may take advantage of a business printer by requiring the user to use transient paper for personal documents. Transient printing policies and enforcement thereof can be project-specific. For example, a policy can indicate that user manuals or guides are to be printed on permanent paper whereas emails and other correspondence are to be printed on transient paper unless they are designated as being integral to the manuals or guides.

FIG. 1 illustrates a first example of a method 100 pertaining to policy enforcement in accordance with embodiments of the disclosed technology. At 102, the system receives a transient printing policy. The transient printing policy can provide instructions, for example, as to when a particular document is to be printed on either permanent document media or on transient document media. The transient printing policy can also provide instructions as to whether a particular user or group of users should select or be forced to use permanent document media or transient document media for the given document.

At 104, the system receives a request to print a particular document. For example, a user may wish to print a certain presentation and send the presentation to a printer as a print job. The user thus sends the print job request, directly or indirectly, to the system.

At 106, the system prints the document in accordance with the transient printing policy and responsive to the print request sent by the user. For example, if the transient printing policy dictates that the document requested to be printed by the user is to be printed using transient document media at all times, then the system can mandate that the user print the document using transient document media.

Figure 2:
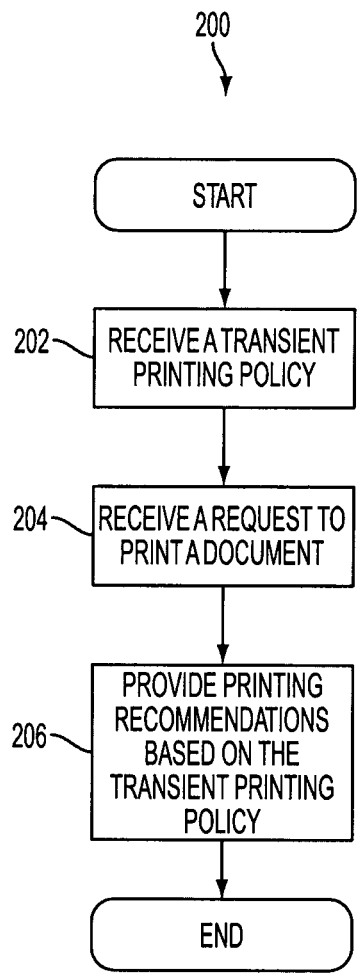
FIG. 2 illustrates a second example of a method pertaining to policy enforcement in accordance with embodiments of the disclosed technology.

FIG. 2 illustrates a second example of a method 200 pertaining to policy enforcement in accordance with embodiments of the disclosed technology. At 202, the system receives a transient printing policy. This step is similar to step 102 of FIG. 1 as described above.

At 204, the system receives a request to print a document. For example, a user may have edited a particular document, such as a presentation, since the last time the user (or any other user) printed the document. Upon finishing the revisions, the user desires to print the current revision. Thus, the user sends a print request to the system.

At 206, the system provides printing recommendations based on the transient printing policy. For example, if the transient printing policy indicates that any revision of the given document other than the final version is to be printed using transient document media, then the system can alert the user that the user should select transient document printing unless the document is in final form. The recommendation can also be specific as to which transient document paper and ink should be used based on the situation.

In certain embodiments, the system can present the recommendation to the user via a dialog box. Once the system provides the user with a recommendation, the user can either follow the recommendation as provided by the system and print the document using transient document media, or the user can instead choose to print the document using traditional, permanent paper.

Transient Printing Learning Behavior and Applications Making Use of the Learned Behavior Certain implementations of the disclosed technology can include the system learning a user's or group of users' behavior in order to encourage or enforce best practices. Based on the learning, for example, the system can effectively make intelligent guesses based on the learned behavior and, in certain embodiments, the system can be set to alter a default mode for a given print job according to a particular user's or group of users' printing behavior. For example, a print driver can begin by defaulting to reusable paper for all print jobs and then recording when a user or group switches to traditional printing.

Over time, the system can learn which applications and under what circumstances the user or group usually prefers permanent documents and transient documents. For example, the system can learn that a particular user prints all of his or her email messages using transient document media. The system can also learn that a particular user always prints a working document on transient document media unless the filename of the document has "FINAL" contained therein.

Based on the learned behavior, the system can subsequently make recommendations to be sent to the user or to other users. The recommendations can suggest that a user print a certain document on either reusable paper or on traditional paper, for example. The recommendations can also be conditional. For example, the system can recommend that the user print the copies of the document using transient printing unless the copies are to be handed out at a meeting, in which event the user should print the copies using traditional, permanent paper.

Figure 3:
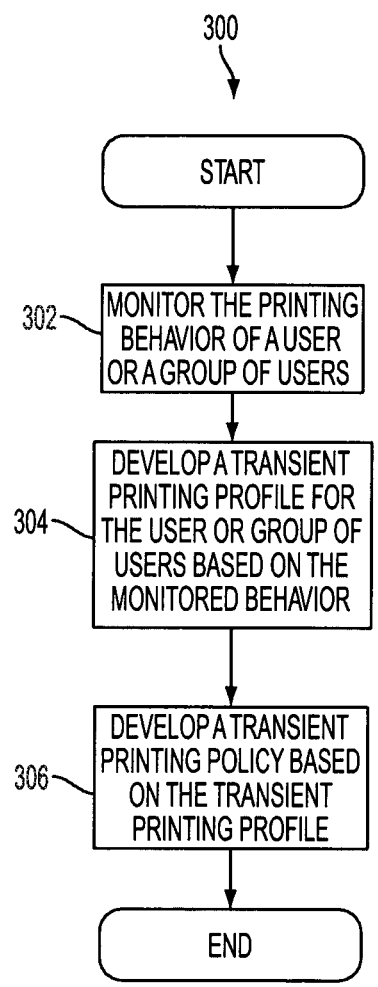
FIG. 3 illustrates a first example of a method of learning behavior in accordance with embodiments of the disclosed technology.

FIG. 3 illustrates a first example of a method of learning behavior in accordance with embodiments of the disclosed technology. At 302, the system monitors the printing behavior of a user or a group of users. For example, the system can monitor how often, if at all, the user or group prints a particular document or type of document using transient printing practices. The system can also monitor how often the user or group prints documents in general, regardless of whether the printing is performed using transient document media. The system can also keep track of potentially unauthorized print jobs.

In certain embodiments, the system can monitor the printing preferences of the user or group. For example, the system can keep track of how often the user or group prints a document in color versus black-and-white. The system can keep track of what kind of document media (e.g., paper and ink) the user selects when printing documents. The system can also keep track of the user's writing style, in terms of how often the user uses bold print, underlining, or images embedded within a text document, for example. In certain implementations, the system can monitor an entire department and correlate the printing preferences of all of the users within the department. The system can also look at specific user trends as well as general department trends.

At 304, the system can develop a transient printing profile for the user or group of users based on the monitoring as performed at 302. If there is no previously created transient printing profile for the user or group, the system can first create an initial transient printing profile. With each print job by the user or group, the system can take note of information pertaining to a wide variety of settings associated with the print job.

In certain embodiments, the transient printing profile can be updated continuously or in discrete intervals, as discussed below with respect to FIG. 4. The transient printing profile can also be sent to a user's supervisor. For example, the system can keep a supervisor apprised as to the user's printing habits.

At 306, the system can develop a transient printing policy based on the transient printing profile as developed at 304. If there is no previously created transient printing policy for the user or group, the system can first create an initial transient printing policy. In certain embodiments, the initial transient printing policy can contain default information and/or instructions. For example, the initial transient printing policy can establish a default that all documents are to be printed using transient document media at all times.

The time of day and/or day of the week can also be considered in forming the recommendation. For example, if a user or group sends a print request for a certain job on a Friday afternoon, the system might determine that it would be advisable to print the job using traditional paper rather than reusable paper. That way, the printout would still be usable on Monday morning because the ink would have not yet faded away to the point of being unreadable.

Figure 4:
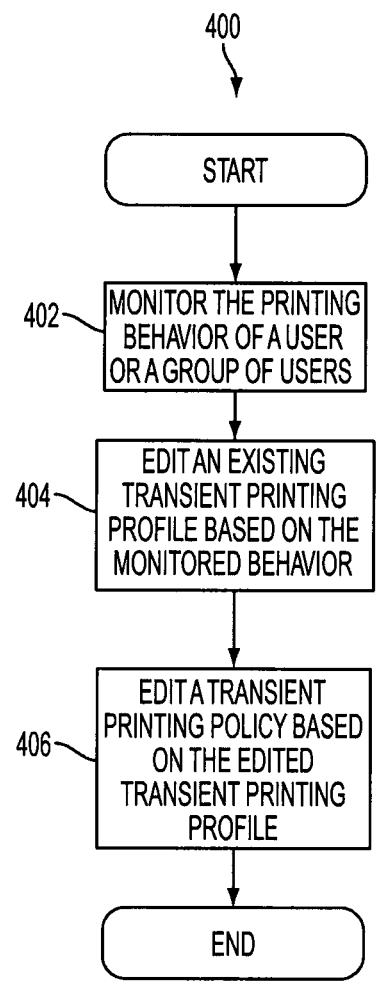
FIG. 4 illustrates a second example of a method of learning behavior in accordance with embodiments of the disclosed technology.

FIG. 4 illustrates a second example of a method of learning behavior in accordance with embodiments of the disclosed technology. At 402, the system monitors the printing behavior of a user or a group of users. This step is similar to step 302 of FIG. 3 as described above.

In the example, the system stores an existing transient printing profile corresponding to a particular user or group of users, such as a department within a company. At 404, the system can update the existing transient printing profile based on the monitoring as performed at 402. For example, if a monitored user has begun printing virtually everything he or she prints using transient document media since the initial transient printing profile was created, the profile can be changed to reflect that user appears to prefer that every document sent to the printer be printed on transient document media.

In the example, the system stores a previously generated transient printing policy. At 406, the system can update the previously generated transient printing policy based on the updating of the transient printing profile as performed at 404. For example, if an entire department has consistently printed all non-final revisions of documents using transient documents over a certain period of time, the transient printing policy can be modified to incorporate a suggestion for other users that non-final revisions of documents from the given department be printed as transient documents. In certain embodiments, the system can require authorization (e.g., from a department head) before making any modifications to the transient printing policy.

In certain embodiments, the effectiveness of the learning can be enhanced by the repeating workflow of various types of office situations. For example, consider a mortgage processor that prints four long jobs from four specific software applications that can be reusable paper jobs and two pages of sign-off forms that should be permanent paper jobs. The application used to print the jobs, the print order of the jobs, and the job size can all be used to estimate the permanency required.

In certain embodiments, the estimation of a desired permanency for a particular document can include keeping track of which user or users have accessed, edited, or approved the document in question over a certain period of time. Certain implementations can include, for example, a sign-off process that can be set to suggest that a given document be printed using transient document media during intermediate stages and permanent document media once a final approval of the document has been obtained.

The system can also establish a desired permanency for a particular document by considering the rate and context of modifications made to the document. For example, the system can recommend that a user print the document using transient document media during the portion of the lifetime of the document life where changes are numerous. Once the document is marked as being complete, however, the system can recommend that the user print the document using permanent document media.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method, comprising:
    receiving a transient printing policy, the transient printing policy comprising a plurality of rules pertaining to transient document printing;
    enforcing the transient printing policy, the enforcement comprising:
        receiving a request to print a document; and
        responsive to the request, providing a printing recommendation based on the transient printing policy by displaying the printing recommendation to a user via a graphical user interface (GUI), wherein the printing recommendation provides an instruction to print the document using at least one of transient document media and traditional document media;
    monitoring a printing behavior of a user;
    generating a transient printing profile for the user based on the monitoring; and
    editing the transient printing policy based on the transient printing profile.

2. The computer-implemented method of claim 1, wherein the printing recommendation designates a particular transient document media type.

3. The computer-implemented method of claim 1, wherein the displaying comprises displaying the printing recommendation to the user via a dialog box.

4. The computer-implemented method of claim 1, further comprising automatically printing the document on the transient document media without providing a notification to a user regarding the automatic printing of the document on the transient document media.

5. One or more tangible computer-readable media storing thereon machine-executable instructions that, when executed by a processor, perform the computer-implemented method of claim 1.

6. A transient printing management system, comprising:
    a memory configured to store a transient printing policy; and
    a processor configured to control:
        a transient printing behavior monitoring module operable to generate a transient printing profile for a user and modify the transient printing profile based at least in part on subsequent monitoring of the user; and
        a transient printing recommendation generation module operable to generate a transient printing recommendation based at least in part on the transient printing policy and the transient printing profile and modify the transient printing recommendation based at least in part on the modified transient printing profile.

7. The transient printing management system of claim 6, wherein the transient printing behavior monitoring module is implemented in connection with a print driver.

8. The transient printing management system of claim 6, wherein the transient printing recommendation generation module is implemented in connection with a print driver.

9. One or more tangible, non-transitory computer-readable media storing thereon machine-executable instructions that, when executed by a processor, perform a method comprising:
    monitoring transient printing behavior of a user, wherein the transient printing behavior comprises at least one of information pertaining to what types of documents the user prints using transient document media, information pertaining to how frequently the user prints documents using transient document media, information pertaining to when the user prints documents using transient document media, and information pertaining to how the user identifies documents that the user prints using transient document media; and
    creating a transient printing profile for the user based on the monitored transient printing behavior.

10. The computer-readable media of claim 9, the method further comprising creating a transient printing policy based on the transient printing profile of the user.

11. The computer-readable media of claim 10, wherein the transient printing policy comprises at least one of information pertaining to time of day, day of week, frequency of changes made by the user to a document to be printed, and identification information pertaining to the document to be printed.

12. The computer-readable media of claim 9, the method further comprising editing a previously created transient printing policy based on the transient printing profile of the user.

13. The computer-readable media of claim 9, the method further comprising editing the transient printing profile based on subsequent monitoring of the transient printing behavior of the user.

14. The computer-readable media of claim 9, the method further comprising storing the transient printing profile.

15. The computer-readable media of claim 9, the method further comprising monitoring transient printing behavior of a group of users.

16. The computer-readable media of claim 15, the method further comprising editing a previously created transient printing policy based on the monitored transient printing behavior of the group of users.

* * * * *